(12) United States Patent
Yamanaka et al.

(10) Patent No.: US 12,386,961 B2
(45) Date of Patent: Aug. 12, 2025

(54) FALSIFICATION DETECTION DEVICE, FALSIFICATION DETECTION METHOD, AND FALSIFICATION DETECTION PROGRAM

(71) Applicant: NIPPON TELEGRAPH AND TELEPHONE CORPORATION, Tokyo (JP)

(72) Inventors: Yuki Yamanaka, Tokyo (JP); Manami Ito, Tokyo (JP); Ryota Sato, Tokyo (JP); Hiroyoshi Takiguchi, Tokyo (JP); Nobuhiro Chiba, Tokyo (JP); Yoshiaki Nakajima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 51 days.

(21) Appl. No.: 18/272,094

(22) PCT Filed: Jan. 13, 2021

(86) PCT No.: PCT/JP2021/000909
§ 371 (c)(1),
(2) Date: Jul. 12, 2023

(87) PCT Pub. No.: WO2022/153410
PCT Pub. Date: Jul. 21, 2022

(65) Prior Publication Data
US 2024/0303332 A1    Sep. 12, 2024

(51) Int. Cl.
*G06F 21/56* (2013.01)
*G06F 21/57* (2013.01)

(52) U.S. Cl.
CPC .......... *G06F 21/565* (2013.01); *G06F 21/566* (2013.01); *G06F 2221/033* (2013.01)

(58) Field of Classification Search
CPC ................. G06F 21/565; G06F 21/566; G06F 2221/033; G06F 21/56; G06F 21/57
See application file for complete search history.

(56) References Cited

U.S. PATENT DOCUMENTS

| 10,733,183 | B2* | 8/2020 | Parayatham ......... G06F 16/245 |
| 2020/0034534 | A1* | 1/2020 | Toley .................... G06F 16/182 |
| 2021/0216659 | A1* | 7/2021 | Kinoshita ........... G06F 16/1727 |
| 2022/0222342 | A1* | 7/2022 | Ma ........................ G06F 21/565 |

FOREIGN PATENT DOCUMENTS

| AU | 2021419776 A1 * | 7/2023 | ........... G06F 21/552 |
| JP | 2004013607 A  * | 1/2004 | |
| JP | 2010211453 A   | 9/2010 | |
| JP | 2019008376 A   | 1/2019 | |
| JP | 2019008732 A   | 1/2019 | |
| JP | 2019207661 A   | 12/2019 | |

* cited by examiner

*Primary Examiner* — Jayesh M Jhaveri

(57) ABSTRACT

A tampering detection device includes tampering detection circuitry configured to acquire an access frequency of a monitoring target file, calculate a number of times of scanning in a scan pattern for each monitoring target file on a basis of the access frequency acquired, and determine the scan pattern on a basis of the number of times of scanning calculated.

6 Claims, 8 Drawing Sheets

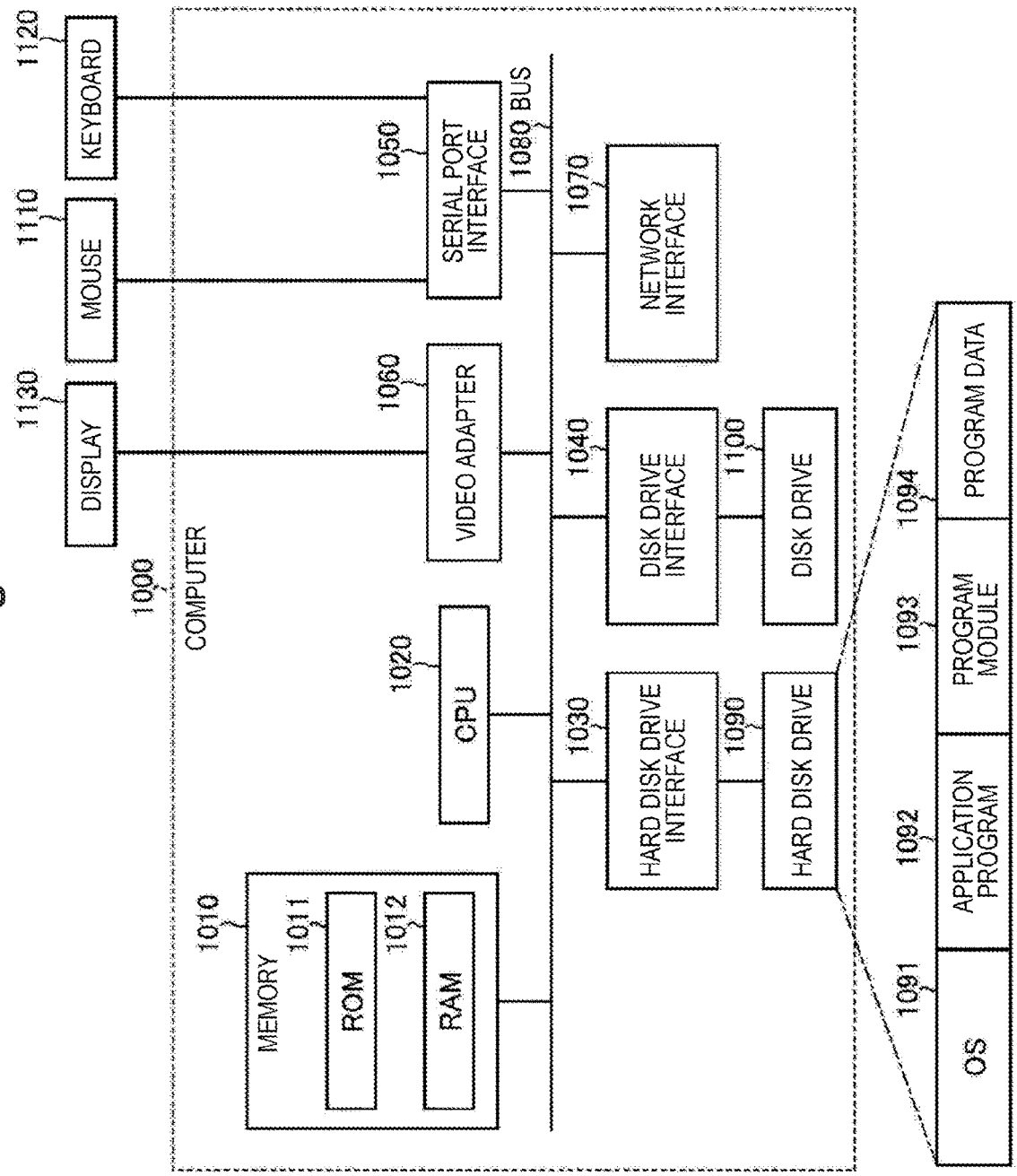

FALSIFICATION DETECTION DEVICE, FALSIFICATION DETECTION METHOD, AND FALSIFICATION DETECTION PROGRAM

CROSS-REFERENCE TO RELATED APPLICATIONS

This application is a U.S. National Stage Application filed under 35 U.S.C. § 371 claiming priority to International Patent Application No. PCT/JP2021/000909, filed on 13 Jan. 2021, the disclosure of which is hereby incorporated herein by reference in its entirety.

TECHNICAL FIELD

The present invention relates to a tampering detection device, a tampering detection method, and a tampering detection program.

BACKGROUND ART

The software tampering detection technique is a technique of acquiring a digest (a hash value or the like) of a monitoring target file at a certain point of time when the file can be regarded as normal, and periodically comparing the acquired digest with the current digest of the monitoring target file to check whether or not the target file has been illicitly tampered with. In general, this tampering detection technique is installed in a certain device, and is used for the purpose of securing authenticity of the device by periodically scanning the entire monitoring target file in the device. As a method of this scanning, the three methods described below have been conventionally used.

The first method is a cyclic scan method. In this method, the entire monitoring target file is scanned in a fixed order based on a certain rule such as ascending order of path names and node number order.

The second method is a random scan method. In this method, a file to be scanned next is uniformly and randomly selected from all monitoring target files, and the file is scanned.

The third method is an on-access scan method. In this method, a function of an operating system (OS) such as fanotify is utilized, an access to a file is detected and hooked, scanning is performed, and file access is permitted when tampering is not performed.

CITATION LIST

Patent Literature

Patent Literature 1: JP 2019-008376 A
Patent Literature 2: JP 2019-008732 A
Patent Literature 3: JP 2019-207661 A

SUMMARY OF INVENTION

Technical Problem

However, in the conventional technique, it is not possible to reduce the possibility that an authorized program executes an illicitly tampered file while suppressing use resources in a monitoring target device. This is because the above-described three scan methods have the problems described below.

In the cyclic scan method, which is the first method, a file that has been scanned once is not scanned again until scanning of all the other files is completed. Therefore, in a situation where available resources such as a central processing unit (CPU) and memory are limited, a time taken until all the files are scanned in one cycle often becomes long. Thus, even when tampering is performed, it is difficult to immediately find the tampering, and there is a possibility that an authorized program executes an illicitly tampered file without noticing the tampering.

In the random scan method, which is the second method, since a file to be scanned is selected completely randomly, there is a possibility that it takes an enormous amount of time from when a certain file is scanned to when the file is scanned next.

In the on-access scan method, which is the third method, the possibility that an authorized program unintentionally executes an illicitly tampered file can be almost completely zeroed, but monitoring and file access hooking in the OS consume considerable memory and CPU resources, and a response of an input/output (I/O) is reduced, so that an operation of the device is considerably affected.

Solution to Problem

In order to solve the above-described problems and achieve the object, a tampering detection device according to the present invention includes: tampering detection circuitry configured to: acquire an access frequency of a monitoring target file; calculate a number of times of scanning in a scan pattern for each monitoring target file on the basis of the access frequency acquired; and determine the scan pattern on the basis of the number of times of scanning calculated.

In addition, a tampering detection method according to the present invention is a tampering detection method executed by a tampering detection device, the method including: acquiring an access frequency of a monitoring target file; calculating a number of times of scanning in a scan pattern for each monitoring target file on the basis of the access frequency acquired; and determining the scan pattern on the basis of the number of times of scanning calculated.

In addition, a non-transitory computer-readable recording medium storing therein a tampering detection program according to the present invention causes a computer to execute: acquiring an access frequency of a monitoring target file; calculating a number of times of scanning in a scan pattern for each monitoring target file on the basis of the access frequency acquired; and determining the scan pattern on the basis of the number of times of scanning calculated.

Advantageous Effects of Invention

The present invention can reduce the possibility that an authorized program executes an illicitly tampered file while suppressing use resources in a monitoring target device.

BRIEF DESCRIPTION OF DRAWINGS

FIG. 8 is a diagram illustrating a computer that executes a program.

DESCRIPTION OF EMBODIMENTS

Hereinafter, an embodiment of a tampering detection device, a tampering detection method, and a tampering detection program according to the present invention will be described in detail with reference to the drawings. Note that the present invention is not limited to the embodiment described below.

First Embodiment

Hereinafter, a configuration of a tampering detection system, a configuration of a tampering detection device, a configuration of a monitoring target device, the definition of each constant, an evaluation index of a scan pattern, a flow of tampering detection processing, and a flow of scan pattern determination processing according to the present embodiment will be described in order, and finally, the effects of the present embodiment will be described.

[Configuration of Tampering Detection System]

Figure 1:
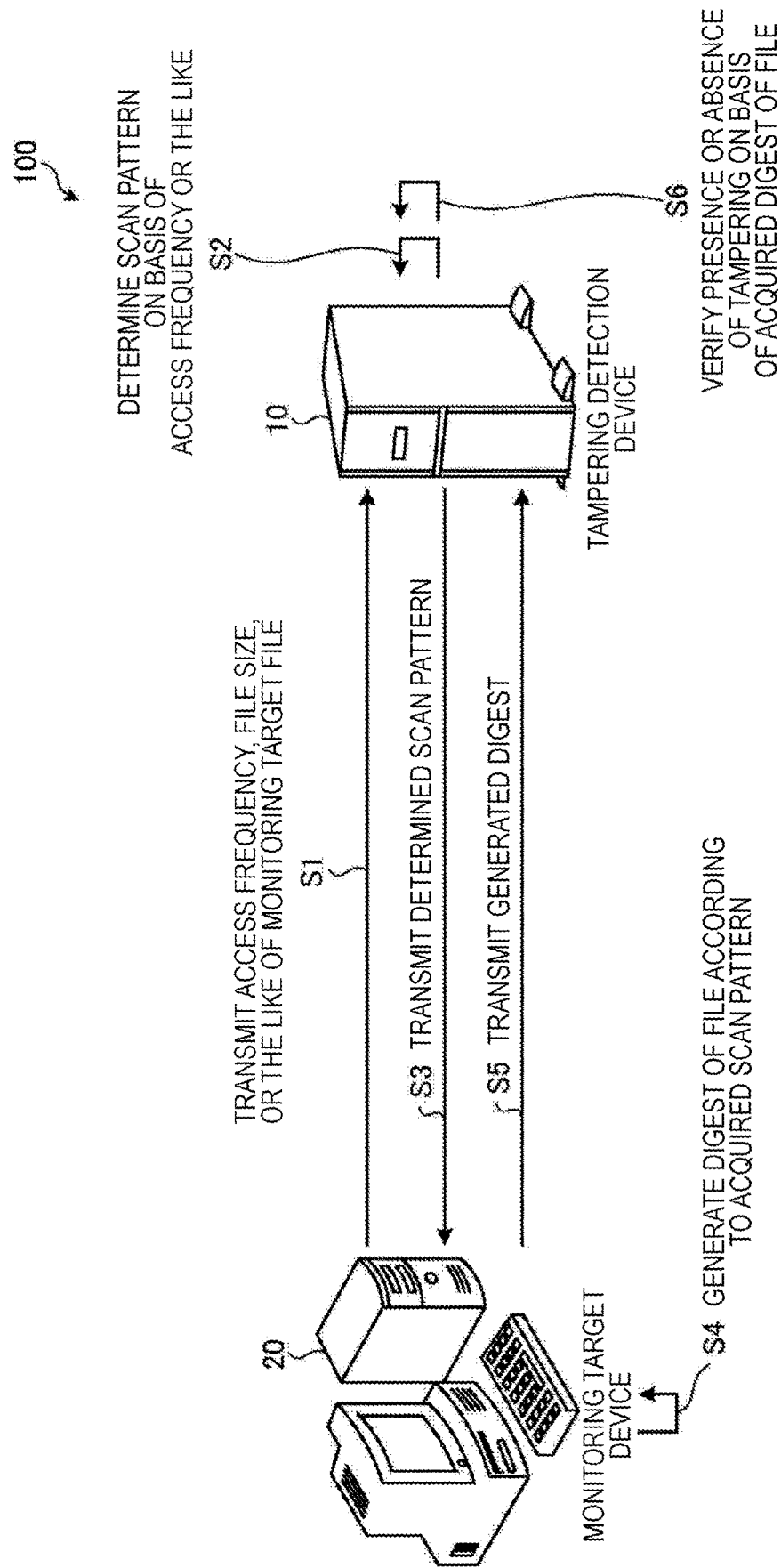
FIG. 1 is a diagram illustrating a configuration example of a tampering detection system according to a first embodiment.

A configuration of a tampering detection system (appropriately referred to as the present system) 100 according to the present embodiment will be described in detail with reference to FIG. 1. FIG. 1 is a diagram illustrating a configuration example of the tampering detection system according to the first embodiment. The tampering detection system 100 includes a tampering detection device 10 such as a server and a monitoring target device 20 such as various terminals. Here, the tampering detection device 10 and the monitoring target device 20 are connected to be communicable by wire or wirelessly via a predetermined communication network, which is not illustrated. Note that tampering detection system 100 illustrated in FIG. 1 may include a plurality of tampering detection devices 10 and a plurality of monitoring target devices 20.

First, the monitoring target device 20 transmits an access frequency, a file size, or the like of the monitoring target file to the tampering detection device 10 as information for determining a scan pattern (step S1). Here, the information for determining the scan pattern is information regarding the monitoring target device ("monitoring target device information" as appropriate) and information regarding the monitoring target file ("file information" as appropriate).

The monitoring target device information is information regarding resources of the monitoring target device or the like, and is, for example, but not particularly limited to, information regarding a processing speed and a use amount of the CPU, a memory capacity, a storage capacity, and hash calculation, information regarding communication, and the like. In addition, the monitoring target device information is basic information of the monitoring target file stored in the monitoring target device or the like, and is, for example, but is not particularly limited to, a file name, a file type, a file size indicating a data size of the file, a list thereof, the number of files stored in the monitoring target device, or the like.

The file information is information regarding access of the monitoring target file stored in the monitoring target device or the like, and includes, for example, information acquired or calculated by the tampering detection device 10 in addition to information such as the number of times of access, an access frequency, and an access source for each file included in an access log, but is not particularly limited thereto.

Next, the tampering detection device 10 determines a scan pattern on the basis of the acquired access frequency or the like (step S2). Here, the scan pattern indicates an order of one cycle of processing (scan processing) in which the monitoring target device 20 generates a digest of each file ("file digest" as appropriate) for the monitoring target file stored in the monitoring target device 20, but is not particularly limited thereto. The scan pattern may indicate a time, an interval, or the like at which each scan processing is performed.

Note that the digest of the file generated by the monitoring target device 20 is, but particularly not limited to, data generated through hash calculation or the like. In addition, the tampering detection device 10 can determine the scan pattern not including a specific file by static or dynamic setting. Detailed scan pattern determination processing by the tampering detection device 10 will be described below in [Flow of Scan Pattern Determination Processing].

Subsequently, the tampering detection device 10 transmits the determined scan pattern to the monitoring target device 20 (step S3). Then, the monitoring target device 20 generates the digest of the file according to the acquired scan pattern (step S4). Further, the monitoring target device 20 transmits the generated digest of the file to the tampering detection device 10 (step S5).

Finally, the tampering detection device 10 verifies whether the file has been tampered with on basis of the acquired digest of the file (step S6). At this time, the tampering detection device 10 compares the digest of the correct file stored in the tampering detection device 10 with the acquired digest of the file, and determines that the file has been tampered with when the digests are different.

The tampering detection system 100 according to the present embodiment acquires a file access log and the file size of a monitoring target file from the monitoring target device, calculates a time required for scanning a target file (=digest acquisition) from the file size on the basis of these pieces of information, and generates a scan pattern in consideration of the time required for scanning for each file and the frequency of access to the target file. Therefore, it is possible to reduce the possibility that an authorized program executes an illicitly tampered file while suppressing use resources in a device.

[Configuration of Tampering Detection Device]

Figure 2:
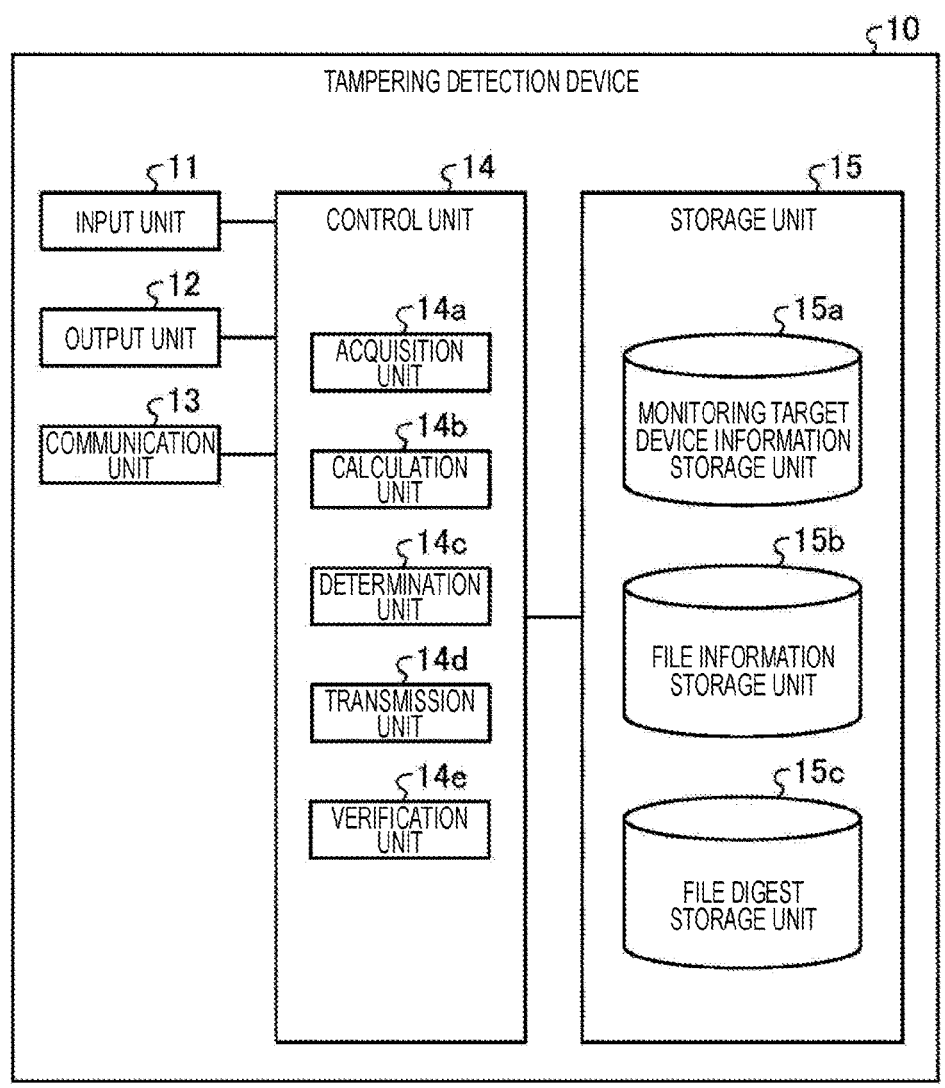
FIG. 2 is a block diagram illustrating a configuration example of a tampering detection device according to the first embodiment.

A configuration of the tampering detection device 10 according to the present embodiment will be described in detail with reference to FIG. 2. FIG. 2 is a block diagram illustrating a configuration example of the tampering detection device according to the present embodiment. The tampering detection device 10 includes an input unit 11, an output unit 12, a communication unit 13, a control unit 14, and a storage unit 15.

The input unit 11 controls inputting various types of information to the tampering detection device 10. The input unit 11 is, for example, a mouse, a keyboard, or the like, and accepts input of setting information or the like to the tampering detection device 10. In addition, the output unit 12 controls outputting various types of information from the tampering detection device 10. The output unit 12 is, for example, a display or the like and outputs the setting information or the like stored in the tampering detection device 10.

The communication unit 13 controls data communication with other devices. For example, the communication unit 13 performs data communication with each communication device. In addition, the communication unit 13 can perform data communication with a terminal of an operator, which is not illustrated.

The storage unit 15 stores various types of information referred to when the control unit 14 operates and various types of information acquired when the control unit 14 operates. The storage unit 15 includes a monitoring target device information storage unit 15a, a file information storage unit 15b, and a file digest storage unit 15c. Here, the storage unit 15 is, for example, a semiconductor memory element such as random access memory (RAM) or flash memory, a storage device such as a hard disk, an optical disc, or the like. Note that, in the example of FIG. 2, the storage unit 15 is installed inside the tampering detection device 10, but may be installed outside the tampering detection device 10, or a plurality of storage units may be installed.

The monitoring target device information storage unit 15a stores monitoring target device information such as information regarding resources of the monitoring target device acquired by an acquisition unit 14a of the control unit 14 and basic information of the monitoring target file. The monitoring target device information storage unit 15a stores, for example, information regarding a processing speed of the CPU, a memory capacity, a storage capacity, and hash calculation as information regarding resources of the monitoring target device, and stores a file name of the file, a file type, a file size indicating a data size of the file, a list thereof, the number of files stored in the monitoring target device, and the like as basic information of the monitoring target file.

The file information storage unit 15b stores, as file information, information included in the access log acquired by the acquisition unit 14a of the control unit 14. For example, the file information storage unit 15b stores information such as the number of times of access, an access frequency, and an access source for each file as information included in the access log described above. Further, the file information storage unit 15b may store the time ("scan pattern set time" as appropriate) $\tau_{all}$ for one scan processing cycle acquired by the acquisition unit 14a.

In addition, the file information storage unit 15b stores information calculated by a calculation unit 14b of the control unit 14 as file information. For example, the file information storage unit 15b stores, as the information calculated by the calculation unit 14b described above, the time ("time required for hash calculation" as appropriate) $\tau_i$ required to calculate the hash value of a file i and the number of times of scanning $k_i$ in the scan pattern for each monitoring target file that minimizes an evaluation index $E[\tau_{attack}]$ to be described below. Further, the file information storage unit 15b may store the scan pattern determined by a determination unit 14c.

The file digest storage unit 15c stores information regarding a correct monitoring target file for verifying tampering acquired by the acquisition unit 14a of the control unit 14. For example, the file digest storage unit 15c stores a file digest generated using hash calculation from a file stored in the monitoring target device as information regarding a correct monitoring target file for verifying tampering.

The control unit 14 controls the entire tampering detection device 10. The control unit 14 includes the acquisition unit 14a, the calculation unit 14b, the determination unit 14c, a transmission unit 14d, and a verification unit 14e. Here, the control unit 14 is, for example, an electronic circuit such as a CPU or a micro processing unit (MPU), or an integrated circuit such as an application specific integrated circuit (ASIC) or a field programmable gate array (FPGA).

The acquisition unit 14a acquires the access frequency of the monitoring target file. For example, the acquisition unit 14a acquires the access frequency from the monitoring target device 20 that stores the monitoring target file. In addition, the acquisition unit 14a acquires the access frequency included in the access log of the monitoring target file of the monitoring target device 20. In addition, the acquisition unit 14a acquires the file size of the monitoring target file and the scan pattern set time. In addition, the acquisition unit 14a calculates and acquires a time required for hash calculation for each file from the acquired file size. Further, the acquisition unit 14a acquires the digest of the file generated by the monitoring target device 20.

On the other hand, the acquisition unit 14a stores the acquired monitoring target device information such as resources of the monitoring target device 20 in the monitoring target device information storage unit 15a. In addition, the acquisition unit 14a stores the acquired file information such as the access frequency in the file information storage unit 15b. Further, the acquisition unit 14a transmits the acquired digest of the file to the verification unit 15e.

The calculation unit 14b calculates the number of times of scanning in the scan pattern for each monitoring target file on the basis of the access frequency acquired by the acquisition unit 14a. For example, the calculation unit 14b calculates the number of times of scanning in the scan pattern for each monitoring target file on the basis of the access frequency, the file size, and the scan pattern set time acquired by the acquisition unit 14a. In addition, the calculation unit 14b calculates, for each monitoring target file, the number of times of scanning in the scan pattern that minimizes an average time from scanning of the monitoring target file to the latest access. On the other hand, the calculation unit 14b stores the file information such as the calculated number of times of scanning in the file information storage unit 15b. Note that detailed calculation processing of the information acquired by the tampering detection device 10 will be described below in [Flow of Scan Pattern Determination Processing].

The determination unit 14c determines a scan pattern on the basis of the number of times of scanning calculated by the calculation unit 14b. In addition, the determination unit 14c randomly determines a scan pattern in which all the monitoring target files are included at least once on the basis of the number of times of scanning calculated by the calculation unit 14b. At this time, the determination unit 14c refers to the monitoring target device information stored in the monitoring target device information storage unit 15a. In addition, the determination unit 14c refers to the file information stored in the file information storage unit 15b. Note that detailed scan pattern determination processing by the tampering detection device 10 will be described below in [Flow of Scan Pattern Determination Processing].

The transmission unit 14d transmits the scan pattern determined by the determination unit 14c to the monitoring target device 20. In addition, the transmission unit 14d may transmit whether the file verified by the verification unit 14e has been tampered with to the monitoring target device 20 or another terminal.

The verification unit 14e verifies whether the file has been tampered with by using the digest of the file generated on the basis of the scan pattern by the monitoring target device 20. At this time, the verification unit 14e refers to the file digest of the correct monitoring target file stored in the file digest storage unit 15c.

[Configuration of Monitoring Target Device]

Figure 3:
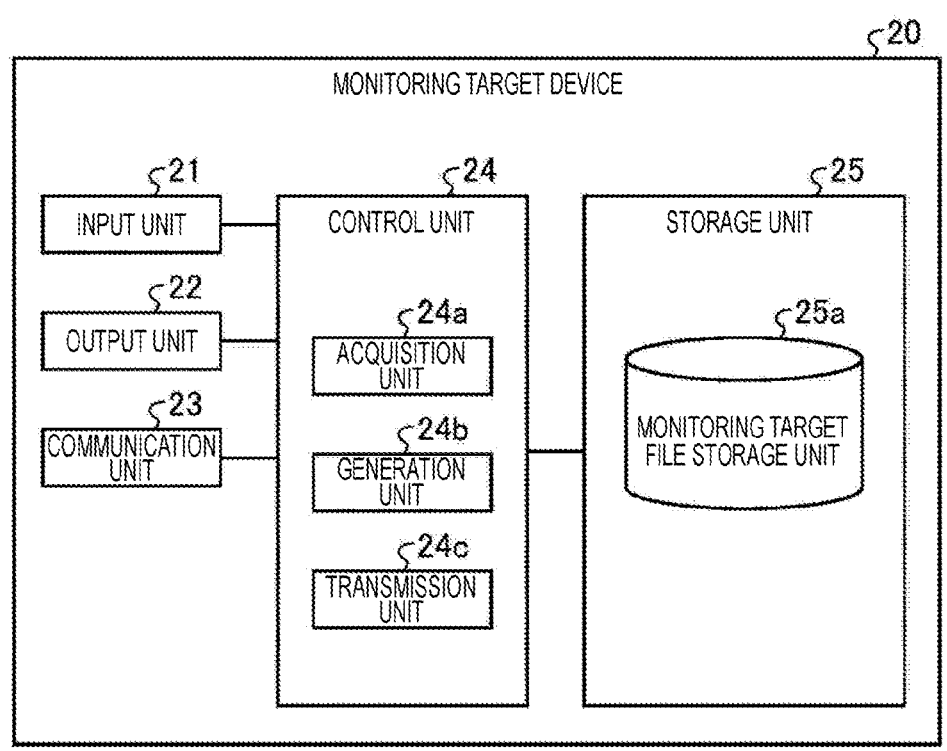
FIG. 3 is a block diagram illustrating a configuration example of a monitoring target device according to the first embodiment.

A configuration of the monitoring target device 20 according to the present embodiment will be described in detail with reference to FIG. 3. FIG. 3 is a block diagram illustrating a configuration example of a monitoring target device according to the present embodiment. The monitoring target device 20 includes an input unit 21, an output unit 22, a communication unit 23, a control unit 24, and a storage unit 25.

The input unit 21 controls inputting various types of information to the monitoring target device 20. The input unit 21 is, for example, a mouse, a keyboard, or the like, and accepts input of setting information or the like to the monitoring target device 20. In addition, the output unit 22 controls outputting various types of information from the monitoring target device 20. The output unit 22 is, for example, a display or the like and outputs the setting information or the like stored in the monitoring target device 20.

The communication unit 23 controls data communication with other devices. For example, the communication unit 23 performs data communication with each communication device. In addition, the communication unit 23 can perform data communication with a terminal of an operator, which is not illustrated.

The storage unit 25 stores various types of information referred to when the control unit 24 operates and various types of information acquired when the control unit 24 operates. The storage unit 25 includes, for example, a monitoring target file storage unit 25a. Here, the storage unit 25 is, for example, a semiconductor memory element such as RAM or flash memory, or a storage device such as a hard disk or an optical disc. Note that, in the example of FIG. 3, the storage unit 25 is installed inside the monitoring target device 20, but may be installed outside the monitoring target device 20, or a plurality of storage units may be installed. The monitoring target file storage unit 25a stores a monitoring target file that can be accessed from the outside or tampered with.

The control unit 24 controls the entire monitoring target device 20. The control unit 24 includes an acquisition unit 24a, a generation unit 24b, and a transmission unit 24c. Here, the control unit 24 is, for example, an electronic circuit such as a CPU or an MPU, or an integrated circuit such as an ASIC or an FPGA.

The acquisition unit 24a acquires a scan pattern of files from the tampering detection device 10. In addition, the acquisition unit 24a may acquire information regarding whether or not the file has been tampered with from the tampering detection device 10.

The generation unit 24b generates the digest of the file according to the scan pattern of the file acquired by the acquisition unit 24a. In addition, the generation unit 24b may store the generated digest of the file in the storage unit 25.

The transmission unit 24c transmits the digest of the file generated by the generation unit 24b to the tampering detection device 10. In addition, the transmission unit 24c may transmit the digest of the file to a terminal other than the tampering detection device 10.

[Definition of Each Constant]

Figure 4:
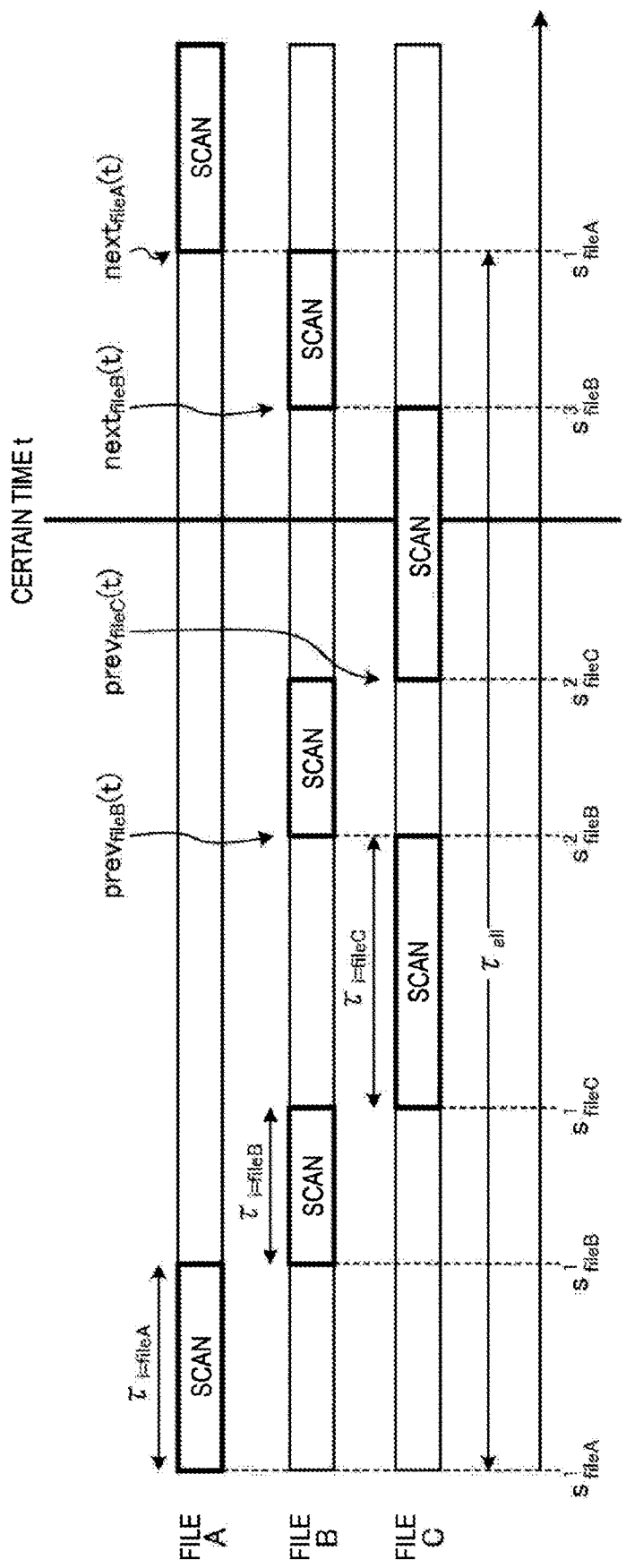
FIG. 4 is a diagram for describing a definition of each constant according to the first embodiment.

The definition of each constant according to the present embodiment will be described in detail with reference to FIG. 4. FIG. 4 is a diagram for describing a definition of each constant according to the first embodiment.

It is assumed that there are N files {1, 2, ..., N} of a monitoring target file group in the monitoring target device 20, and an i-th file is referred to as a file i. In addition, the symbol i is also used as a symbol indicating a file name of an arbitrary file as appropriate, such as "i=file A".

"$\tau_i$" represents a time required for hash calculation of the file i, and a numerical value thereof is obtained by Formula (1). Here, the constant determined by the hash calculation method is a calculation amount for each byte of the file depending on the hash algorithm.

[Math. 1]

$$\tau_i = \frac{[\text{Constant determined by hash calculation method}] \cdot [\text{Size of file } i]}{[\text{Use amount of } CPU] + [\text{Delay by communication or the like}]} \quad (1)$$

Note that, in FIG. 4, the time required for the hash calculation of "file A", "file B", and "file C" is illustrated.

"$\tau_{av}$" represents an average time required for hash calculation of the file, and a numerical value thereof is obtained by Formula (2).

[Math. 2]

$$\tau_{av} = E[\tau_i] = \frac{1}{N}\sum_{i=1}^{} \tau_i \quad (2)$$

Formula (3) represents a scan pattern for the file i. Here, "$s_i^j$" represents a j-th scan start time for the file i, and "$k_i$" represents the number of times of scanning in the scan pattern for the file i, that is, the number of times of scanning per scan processing cycle.

[Math. 3]

$$[s_i^1, s_i^2, \ldots, s_i^{k_i}] \quad (3)$$

Note that FIG. 4 illustrates first scan start times of the first and second cycles for "file A", first to third scan start times of the first cycle for "file B", and first and second scan start times of the first cycle for "file C".

"$\tau_{all}$" represents the time required to execute the scan pattern, that is, the time for one scan processing cycle, and is expressed by Formula (4).

[Math. 4]

$$\tau_{all} = \sum_i k_i \tau_i \quad (4)$$

Note that, in FIG. 4, the time from the first scan start time for "file A" to the third scan end time for "file B" corresponds to "$\tau_{all}$".

"$\text{next}_i(t)$" is a time at which scanning of the file i is started for the first time after a certain time t, and is determined by a scan pattern. Note that, in FIG. 4, "$next_i(t)$" is illustrated for each of scans of "file A" and "file B" after a certain time t.

"$prev_i(t)$" is a time at which scanning of the file i is started immediately before a certain time t, and is determined by a scan pattern. Note that, in FIG. 4, "$prev_i(t)$" is illustrated for each of scans of "file B" and "file C" immediately before a certain time t.

[Evaluation Index of Scan Pattern]

Figure 5:
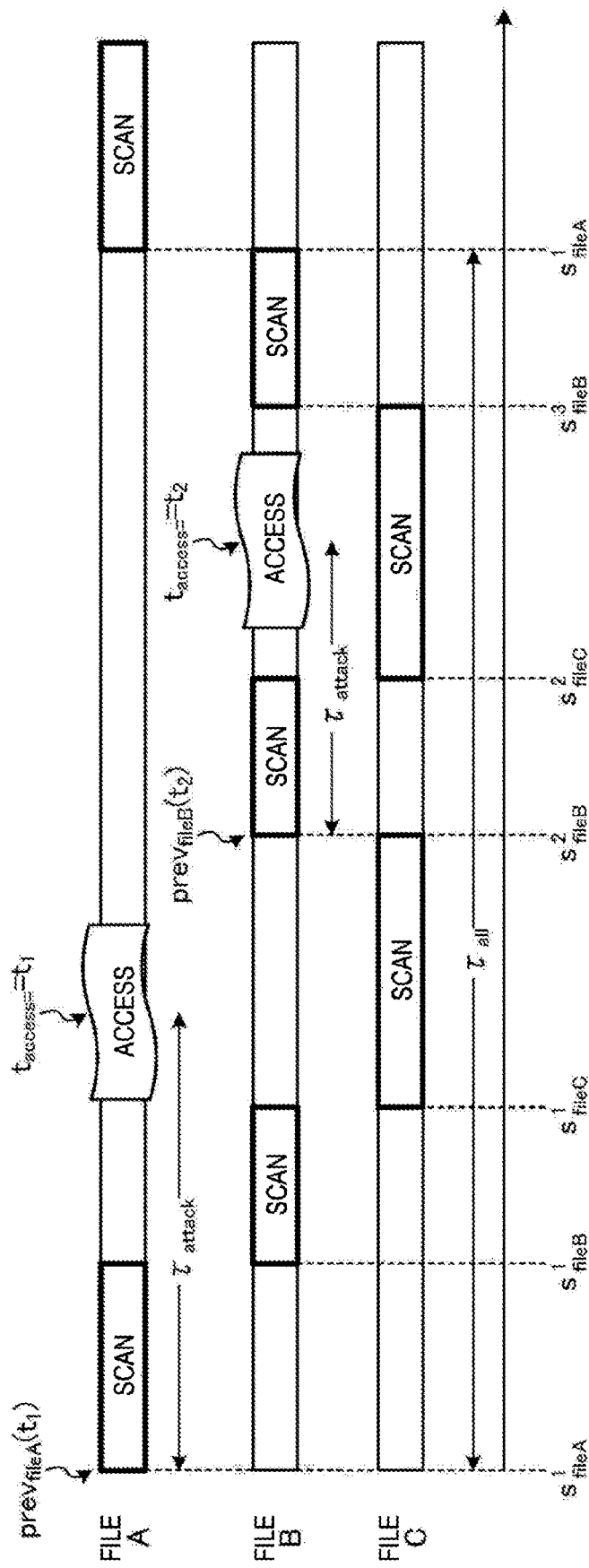
FIG. 5 is a diagram for describing an evaluation index of a scan pattern according to the first embodiment.

The evaluation index of the scan pattern according to the present embodiment will be described in detail with reference to FIG. 5. FIG. 5 is a diagram for describing an evaluation index of a scan pattern according to the first embodiment. In the present embodiment, $E[\tau_{attack}]$ is introduced as an evaluation index for determining whether a scan pattern is good or bad in order to formulate a "possibility that an authorized program unintentionally executes an illicitly tampered file". Hereinafter, the definition and optimization of the evaluation index $E[\tau_{attack}]$ will be described.

(Definition of Evaluation Index $E[\tau_{attack}]$)

First, the definition of the evaluation index $E[\tau_{attack}]$ will be described. "$\tau_{attack}$" represents a time until another process uses the file i after the file i is scanned, that is, a time from scanning to the latest access, and a numerical value thereof is obtained by Formula (5). Here, "$t_{access}$" is a time at which the file i is read by another process, that is, a time at which the file i is accessed, and it is assumed that all accesses occur instantaneously without time width.

[Math. 5]

$$\tau_{attack} = t_{access} - prev_i(t_{access}) \quad (5)$$

Note that, in FIG. 5, an access to "file A" occurs at time $t_1$, and time $T_{attack}$ until "file A" is accessed after scanning is illustrated. In addition, an access to "file B" occurs at time $\tau_2$, and time $\tau_{attack}$ until "file B" is accessed after scanning is illustrated.

In addition, "$q_i(t)$" represents a probability that an access to the file i occurs at a certain time t.

As described above, the evaluation index $E[\tau_{attack}]$ represents an average time until another process reads the monitoring target file after scanning, that is, an average time from scanning of the monitoring target file to the latest access, and is expressed by Formula (6). Note that the evaluation index $E[\tau_{attack}]$ can also be defined as "an unprotected time of the monitoring target file" or "a tamperable time of the monitoring target file".

[Math. 6]

$$E[\tau_{attack}] = \frac{1}{N} \sum_i \int (t - prev_i(t)) q_i(t) dt \quad (6)$$

When the evaluation index $E[\tau_{attack}]$ is reduced, even if tampering occurs, scanning is performed before the file is used. Note that, in the on-access scan method, this index is zero.

(Optimization of Evaluation Index $E[\tau_{attack}]$)

Next, optimization of the evaluation index $E[\tau_{attack}]$ according to the present embodiment will be described. First, at the time of tampering detection, it is desired to generate a scan pattern that reduces the evaluation index $E[\tau_{attack}]$. However, in general, a probability $q_i(t)$ that an access from an authorized program occurs to the file i at a certain time t is unknown. Therefore, in Formula (6) above, various optimization methods are conceivable depending on how to handle $q_i(t)$. Hereinafter, an optimization method in which $q_i(t)$ is constant without depending on the time t and only the access frequency of each file is taken into account will be described.

In Formula (6), when $q_i(t)$ is constant without depending on the time t and is set to "$q_i$", it can be expressed as Formula (7).

[Math. 7]

$$E[\tau_{attack}] = \frac{1}{N} \sum_i q_i \int (t - prev_i(t)) dt \quad (7)$$

In addition, in above Formula (7), "$f_i(t)$" (integration calculation part) related to the time t is expressed as in Formula (8).

[Math. 8]

$$f_i(t) = \int (t - prev_i(t)) dt \quad (8)$$

Here, assuming that the monitoring target file is randomly scanned, $f_i(t)$ can be approximated to "proportional to a reciprocal ($1/k_i$) of the number of times of accessing the file i in one scan processing cycle". Therefore, $E[\tau_{attack}]$ can be expressed as Formula (9).

[Math. 9]

$$E[\tau_{attack}] \propto \frac{1}{N} \sum_i \frac{q_i}{k_i} \quad (9)$$

$k_i$ that minimizes $E[\tau_{attack}]$ of above Formula (9) is obtained under the constraint conditions represented by Formulae (10) and (11) below.

[Math. 10]

$$\frac{1}{N} \sum_i q_i = 1 \quad (10)$$

[Math. 11]

$$\sum_i \tau_i k_i = \tau_{all} \quad (11)$$

When it is assumed that the time $\tau_i$ required for the hash calculation is constant regardless of the file, Formula (12) is a solution.

[Math. 12]

$$k_i \propto q_i \quad (12)$$

As described above, since $k_i$ is proportional to the scan frequency for the file i, the optimization of the evaluation index $E[\tau_{attack}]$ according to the present embodiment is a method of "generating a random scan pattern in which scan is performed more frequently as access frequency of file is higher in consideration of time required for scan according to file size".

[Flow of Tampering Detection Processing]

Figure 6:
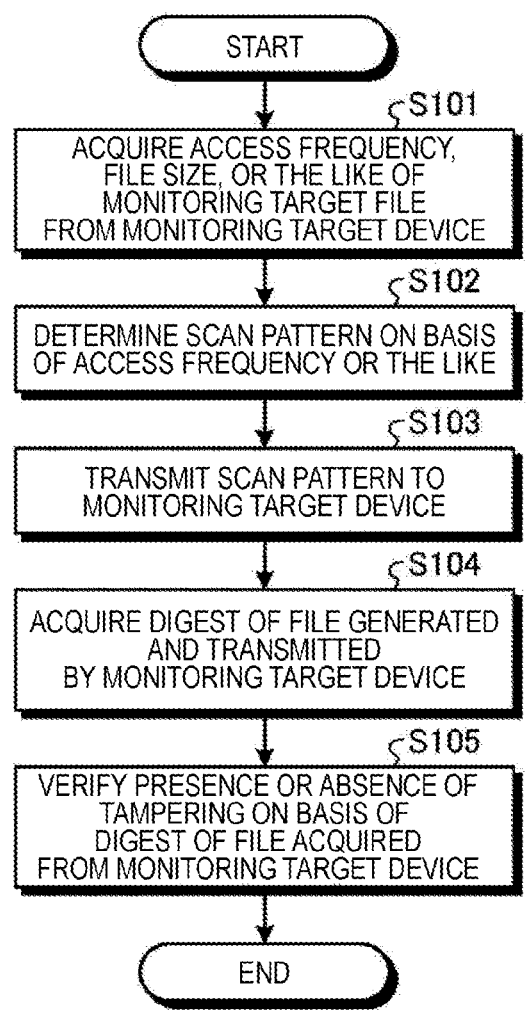
FIG. 6 is a flowchart illustrating an example of a flow of tampering detection processing according to the first embodiment.

A flow of the tampering detection processing according to the present embodiment will be described in detail with reference to FIG. 6. FIG. 6 is a flowchart illustrating an example of a flow of tampering detection processing according to the first embodiment. First, the acquisition unit 14a of the tampering detection device 10 acquires information such as information of an access frequency and a file size of a monitoring target file from the monitoring target device 20 (step S101). At this time, the acquisition unit 14a may acquire the information from a device other than the monitoring target device 20. In addition, the acquisition unit 14a may acquire information directly input via the input unit 11.

Next, the determination unit 14c determines an optimum scan pattern on the basis of the information acquired from the monitoring target device 20 such as access frequency (step S102). At this time, the calculation unit 14b may perform calculation processing for information necessary for the determination unit 14c to determine the scan pattern. In addition, when there is a scan pattern created in advance, the determination unit 14c can also adopt this scan pattern. Further, when a plurality of scan patterns can be determined, the determination unit 14c can adopt one or a plurality of scan patterns from the scan patterns.

Subsequently, the transmission unit 14d transmits the scan pattern to the monitoring target device 20 (step S103). At this time, the transmission unit 14d may transmit the scan patterns in bulk (collectively) or may transmit the scan patterns one by one. In addition, the transmission unit 14d may transmit a plurality of scan patterns.

Then, the acquisition unit 14a acquires a digest of a file generated by the generation unit 24b of the monitoring target device 20 and transmitted by the transmission unit 24c (step S104). Finally, the verification unit 14e verifies whether the file has been tampered with on the basis of the digest of the file acquired by the acquisition unit 14a (step S105), and the tampering detection processing ends. Note that the transmission unit 14d may transmit whether the file has been tampered with verified by the verification unit 14e to the monitoring target device 20 or another terminal.

[Flow of Scan Pattern Determination Processing]

Figure 7:
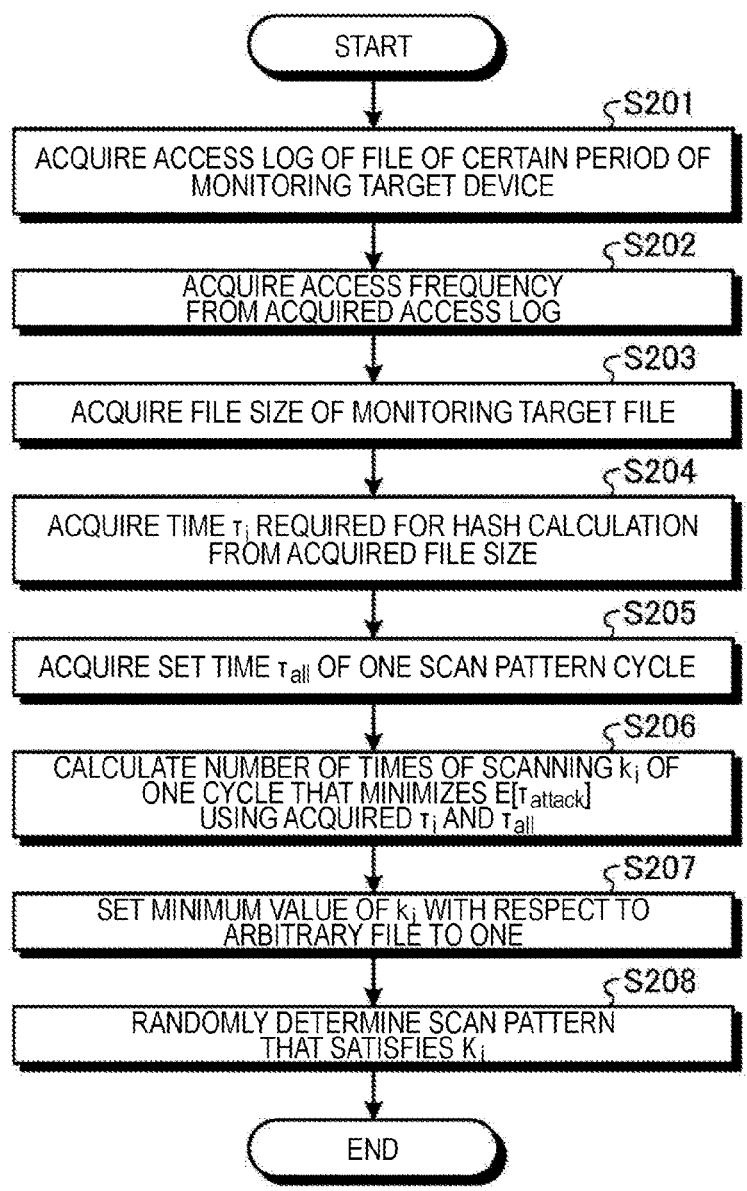
FIG. 7 is a flowchart illustrating an example of a flow of scan pattern determination processing according to the first embodiment.

The flow of the scan pattern determination processing according to the present embodiment will be described in detail with reference to FIG. 7. FIG. 7 is a flowchart illustrating an example of a flow of scan pattern determination processing according to the first embodiment.

First, the acquisition unit 14a of the tampering detection device 10 acquires an access log of a monitoring target file in the monitoring target device 20 for a certain period from the monitoring target device 20 (step S201), and acquires an access frequency for each monitoring target file from the access log (step S202).

At this time, the acquisition unit 14a may acquire the access log from a device other than the monitoring target device 20. In addition, the acquisition unit 14a may acquire the access log directly input via the input unit 11. Note that in a certain period regarding the acquisition of the access log, the monitoring target device 20 may perform the scan processing by an arbitrary method or may not perform the scan processing.

Next, the acquisition unit 14a of the tampering detection device 10 acquires the file size of the monitoring target file from the monitoring target device 20 (step S203). At this time, the acquisition unit 14a may acquire the file size from a device other than the monitoring target device 20. In addition, the acquisition unit 14a may acquire the file size directly input via the input unit 11.

Then, the acquisition unit 14a calculates and acquires a time $\tau_1$ required for hash calculation for each file from the file size described above and the like (step S204). Note that the acquisition unit 14a uses above Formula (1) when calculating $\tau_i$ described above. In addition, the acquisition unit 14a may calculate and acquire an average time $\tau_{av}$ required for hash calculation of the file represented by Formula (2) described above.

Subsequently, the acquisition unit 14a acquires a set time $\tau_{all}$ of one scan processing cycle (step S205). Here, $\tau_{all}$ is a numerical value given as a set value from the outside, but is not particularly limited. The acquisition unit 14a may acquire Tau from the monitoring target device 20 or another terminal, or may acquire $\tau_{all}$ directly input via the input unit 11.

Note that the order of the processing of steps S201 to S205 is exemplary, and the acquisition unit 14a can also perform the processing in a different order. In addition, the acquisition unit 14a can omit part of the processing of steps S201 to S205.

Thereafter, the calculation unit 14b calculates the number of times of scanning $k_i$ of one cycle that minimizes the evaluation index $E[\tau_{attack}]$ using acquired $\tau_i$ and $\tau_{all}$ (step S206). At this time, when it is desired to generate a scan pattern so as to scan all the files at least once in one cycle, the calculation unit 14b sets the minimum value of $k_i$ for an arbitrary file to one (step S207). Finally, the determination unit 14c randomly determines a scan pattern that satisfies $k_i$ (step S208), and the processing ends.

[Effects of First Embodiment]

First, in the tampering detection processing according to the present embodiment described above, the access frequency of the monitoring target file is acquired, the number of times of scanning in the scan pattern is calculated for each monitoring target file on the basis of the acquired access frequency, and the scan pattern is determined on the basis of the calculated number of times of scanning. Thus, in the present processing, it is possible to reduce the possibility that an authorized program executes an illicitly tampered file while suppressing use resources in a monitoring target device.

Second, in the tampering detection processing according to the present embodiment described above, the file size of the monitoring target file and the scan pattern set time are further acquired, and the number of times of scanning is calculated on the basis of the access frequency, the file size, and the set time. Thus, in the present processing, it is possible to more efficiently reduce the possibility that an authorized program executes an illicitly tampered file while suppressing use resources in a monitoring target device.

Third, in the tampering detection processing according to the present embodiment described above, the number of times of scanning that minimizes an average time from scanning of the monitoring target file to the latest access is calculated. Thus, in the present processing, it is possible to more effectively reduce the possibility that an authorized program executes an illicitly tampered file while suppressing use resources in a monitoring target device.

Fourth, in the tampering detection processing according to the present embodiment described above, a scan pattern in which all the monitoring target files are included at least once is randomly determined on the basis of the number of times of scanning. Thus, in the present processing, it is possible to more comprehensively reduce the possibility that an authorized program executes an illicitly tampered file while suppressing use resources in a monitoring target device.

Fifth, in the tampering detection processing according to the present embodiment described above, the access frequency is acquired from the monitoring target device that stores the monitoring target file, the scan pattern is transmitted to the monitoring target device, and whether or not the file has been tampered with is verified using the digest of the file generated on the basis of the scan pattern by the monitoring target device. Thus, in the present processing, in software tampering detection, it is possible to optimally and comprehensively monitor all the files, and it is possible to reduce the possibility that an authorized program executes an illicitly tampered file while suppressing use resources in the monitoring target device.

[System Configuration or the Like]

Each component of each device that has been illustrated according to the embodiment described above is functionally conceptual and does not necessarily have to be physically configured as illustrated. In other words, a specific form of distribution and integration of individual devices is not limited to the illustrated form, and all or part of the configuration can be functionally or physically distributed and integrated in any unit according to various loads, usage conditions, and the like. Further, all or any part of each processing function performed in each device can be implemented by a CPU and a program to be analyzed and executed by the CPU or can be implemented as hardware by wired logic.

In addition, among the individual processing described in the embodiment described above, all or part of the processing described as being automatically performed can be manually performed, or all or part of the processing described as being manually performed can be automatically performed by a known method. Additionally, the processing procedures, the control procedures, the specific names, and the information including various data and parameters illustrated in the specification and the drawings can be arbitrarily changed unless otherwise specified.

[Program]

In addition, it is also possible to create a program in which the processing executed by the tampering detection device 10 described in the foregoing embodiment is described in a language which can be executed by a computer. In this case, the computer executes the program, and thus, the effects similar to those of the embodiment described above can be obtained. Further, the program may be recorded in a computer-readable recording medium, and the program recorded in the recording medium may be read and executed by the computer. Thereby, processing similar to the embodiment described above may be realized.

FIG. 8 is a diagram illustrating a computer that executes a program. As illustrated in FIG. 8, a computer 1000 includes, for example, memory 1010, a CPU 1020, a hard disk drive interface 1030, a disk drive interface 1040, a serial port interface 1050, a video adapter 1060, and a network interface 1070. These units are connected by a bus 1080.

As exemplified in FIG. 8, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as exemplified in FIG. 8. The disk drive interface 1040 is connected to a disk drive 1100 as exemplified in FIG. 8. For example, a removable storage medium such as a magnetic disk or an optical disk is inserted into the disk drive 1100. As exemplified in FIG. 8, the serial port interface 1050 is connected to, for example, a mouse 1110 and a keyboard 1120. As exemplified in FIG. 8, the video adapter 1060 is connected to, for example, a display 1130.

Here, as exemplified in FIG. 8, the hard disk drive 1090 stores, for example, an OS 1091, an application program 1092, a program module 1093, and program data 1094. In other words, the above program is stored, for example, in the hard disk drive 1090 as a program module in which a command to be executed by the computer 1000 is described.

In addition, various data described in the embodiment described above is stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary and executes various processing procedures.

Note that the program module 1093 and the program data 1094 related to the program are not limited to being stored in the hard disk drive 1090 and may be stored in, for example, a removable storage medium and may be read by the CPU 1020 via a disk drive, or the like. Alternatively, the program module 1093 and the program data 1094 related to the program may be stored in another computer connected via a network (such as a local area network (LAN) or a wide area network (WAN)) and may be read by the CPU 1020 via the network interface 1070.

The embodiment described above and modifications thereof are included in the inventions recited in the claims and the equivalent scope thereof, similarly to being included in the technique disclosed in the present application.

| Reference Signs List | |
|---|---|
| 10 | Tampering detection device |
| 11 | Input unit |
| 12 | Output unit |
| 13 | Communication unit |
| 14 | Control unit |
| 14a | Acquisition unit |
| 14b | Calculation unit |
| 14c | Determination unit |
| 14d | Transmission unit |
| 14e | Verification unit |
| 15 | Storage unit |
| 15a | Monitoring target device information storage unit |
| 15b | File information storage unit |
| 15c | File digest storage unit |
| 20 | Monitoring target device |
| 21 | Input unit |
| 22 | Output unit |
| 23 | Communication unit |
| 24 | Control unit |
| 24a | Acquisition unit |
| 24b | Generation unit |
| 24c | Transmission unit |
| 25 | Storage unit |
| 25a | Monitoring target file storage unit |
| 100 | Tampering detection system |

The invention claimed is:

1. A tampering detection device comprising: tampering detection circuitry configured to:
   acquire information on resources of a monitoring target device, an access frequency and a file size of a monitoring target file in the monitoring target device, and a scan pattern set time;
   calculate a time required for hash calculation using the information on resources and the file size acquired by the acquisition step, and calculate a number of times of scanning in a scan pattern for each monitoring target file on a basis of the time required for hash calculation and the access frequency; and determine the scan pattern on a basis of the number of times of scanning calculated.

2. The tampering detection device according to claim 1, wherein the tampering detection circuitry configured to
calculate the number of times of scanning thereby minimizing an average time lapse between an occurrence of scanning the monitoring target file and a first-time occurrence of an access to the monitoring target file subsequent to the occurrence.

3. The tampering detection device according to claim 1, wherein the tampering detection circuitry configured to
randomly determine a scan pattern in which all the monitoring target files are included at least once on a basis of the number of times of scanning.

4. The tampering detection device according to claim 1, wherein the tampering detection circuitry configured to
acquire the access frequency from a monitoring target device that stores the monitoring target file, and
the tampering detection device further comprises: tampering detection circuitry configured to:
transmit the scan pattern to the monitoring target device; and
verify whether or not the file has been tampered by using a digest of a file generated on a basis of the scan pattern by the monitoring target device.

5. A tampering detection method executed by a tampering detection device, the method comprising:
acquiring information on resources of a monitoring target device, an access frequency and a file size of a monitoring target file in the monitoring target device, and a scan pattern set time;
calculating a time required for hash calculation using the information on resources and the file size acquired by the acquiring process, and calculating a number of times of scanning in a scan pattern for each monitoring target file on a basis of the time required for hash calculation and the access frequency; and
determining the scan pattern on a basis of the number of times of scanning calculated.

6. A non-transitory computer-readable recording medium storing therein a tampering detection program causing a computer to execute a process comprising:
acquiring information on resources of a monitoring target device, an access frequency and a file size of a monitoring target file in the monitoring target device, and a scan pattern set time;
calculating a time required for hash calculation using the information on resources and the file size acquired by the acquisition step, and calculating a number of times of scanning in a scan pattern for each monitoring target file on a basis of the time required for hash calculation and the access frequency; and
determining the scan pattern on a basis of the number of times of scanning calculated.

* * * * *